US010356791B2

(12) United States Patent
DiFrancesco

(10) Patent No.: US 10,356,791 B2
(45) Date of Patent: Jul. 16, 2019

(54) METHOD, MOBILE TERMINAL AND COMPUTER PROGRAM

(71) Applicants: Sony Corporation, Tokyo (JP); Sony Europe Limited, Weybridge (GB)

(72) Inventor: Renaud DiFrancesco, London (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 19 days.

(21) Appl. No.: 15/511,895

(22) PCT Filed: Aug. 14, 2015

(86) PCT No.: PCT/GB2015/052351
§ 371 (c)(1),
(2) Date: Mar. 16, 2017

(87) PCT Pub. No.: WO2016/046515
PCT Pub. Date: Mar. 31, 2016

(65) Prior Publication Data
US 2017/0295569 A1    Oct. 12, 2017

(30) Foreign Application Priority Data
Sep. 23, 2014 (GB) .................................. 1416795.1

(51) Int. Cl.
*H04J 3/00* (2006.01)
*H04W 72/04* (2009.01)
(Continued)

(52) U.S. Cl.
CPC ......... *H04W 72/048* (2013.01); *H04L 67/325* (2013.01); *H04W 64/006* (2013.01); *H04W 72/0446* (2013.01); *H04W 72/1247* (2013.01)

(58) Field of Classification Search
CPC ............. H04W 72/048; H04W 67/325; H04W 64/006; H04W 72/0446; H04W 72/1247
(Continued)

(56) References Cited

U.S. PATENT DOCUMENTS 6,597,906 B1    7/2003  Van Leeuwen et al.
6,721,572 B1 *  4/2004  Smith .................. H04W 76/19
                                                      455/456.1
(Continued)

FOREIGN PATENT DOCUMENTS

EP    1 085 696 A1    3/2001
EP    1 209 930 A2    5/2002
(Continued)

OTHER PUBLICATIONS

International Search Report dated Nov. 5, 2015, in PCT/GB2015/052351 filed Aug. 14, 2015.

*Primary Examiner* — Sai Ming Chan
(74) *Attorney, Agent, or Firm* — Oblon, McClelland, Maier & Neustadt, L.L.P.

(57) ABSTRACT

A method of transmitting data from a mobile terminal over a wireless network. The method includes: applying a different priority level to different types of data transmission; determining quantity of data remaining before expiry of the data connection between the mobile terminal and the wireless network; and transmitting the different types of data over the network in an order determined by the applied priority level.

20 Claims, 18 Drawing Sheets

(51) Int. Cl.
  *H04L 29/08* (2006.01)
  *H04W 72/12* (2009.01)
  *H04W 64/00* (2009.01)
(58) Field of Classification Search
  USPC .......................................................... 370/336
  See application file for complete search history.

(56) References Cited

U.S. PATENT DOCUMENTS

| | | |
|---|---|---|
| 2005/0190796 A1* | 9/2005 | Date ..................... H04L 12/407 |
| | | 370/503 |
| 2009/0203379 A1 | 8/2009 | Karaoguz |
| 2009/0203388 A1 | 8/2009 | Karaoguz |
| 2010/0240346 A1* | 9/2010 | Jain ......................... H04W 4/02 |
| | | 455/414.1 |
| 2012/0178376 A1 | 7/2012 | Jain et al. |
| 2016/0021190 A1* | 1/2016 | Vuyyuru ................ H04L 67/18 |
| | | 709/223 |

FOREIGN PATENT DOCUMENTS

| | | |
|---|---|---|
| EP | 1 544 574 A1 | 6/2005 |
| EP | 1 737 160 A1 | 12/2006 |
| WO | WO 96/13951 A1 | 5/1996 |

* cited by examiner

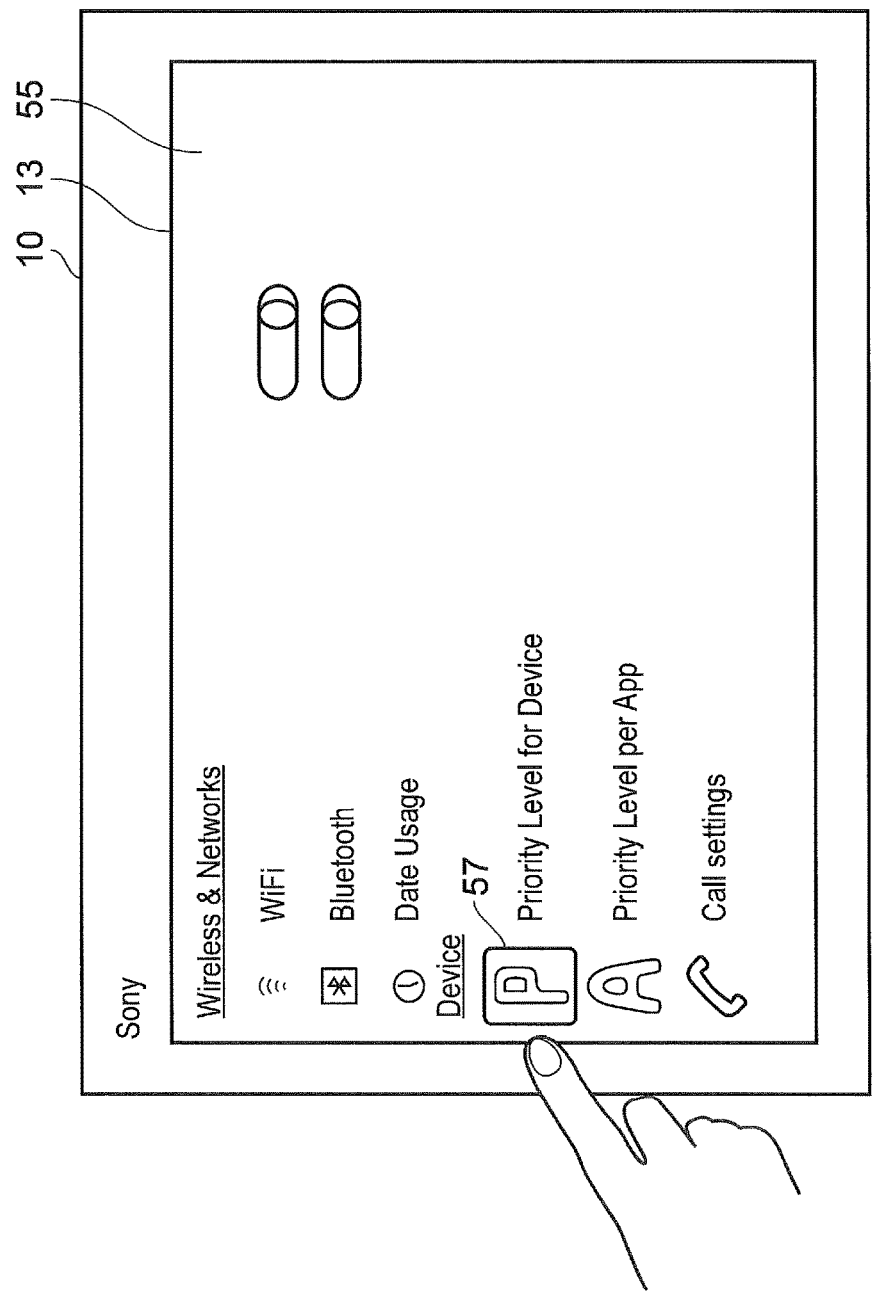

Priority List on Terminal

| High Priority | Medium Priority | Low Priority |
|---|---|---|
| Social Network notification | Recommendation services, advertising etc | VOIP |
| Email | Location based guides/information | Shopping App |
| Navigation when requiring data access | Upload of photo/video to cloud. Chunking of live video streams | Music/Stream download |
| Messenger | | Video Stream Receipt |
| Receipt of audio messages | | Email attachment download |
| Banking Apps | | |
| VPN | | |

FIG. 6

Application List on Terminal

| Application | Feature |
|---|---|
| Facebook | Social Network Notifications |
| | Upload of photo/video to cloud |
| | Messenger |
| | Recommendation services |
| Skype | VOIP |
| | Social Network Notifications |
| | Receipt of Audio messages |
| | Video Stream Receipt |
| | Upload of photo/video to cloud |

FIG. 7

User History on Terminal

| Route | Location | Time | Data Throughput (Mb/s) |
|---|---|---|---|
| 21 Goal St to 7 Free Close (Home to Work) | BT-QRSER | 08:15:23 | 2.1 |
| | Virgin-022121 | 08:21:31 | 1.2 |
| | SKY-21234 | 08:29:01 | 1.7 |
| | Virgin-217879 | 08:37:17 | 0.3 |
| | Virgin-352859 | 08:41:42 | 0.2 |

FIG. 8

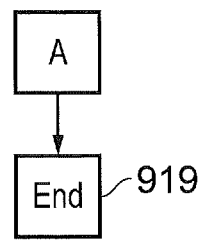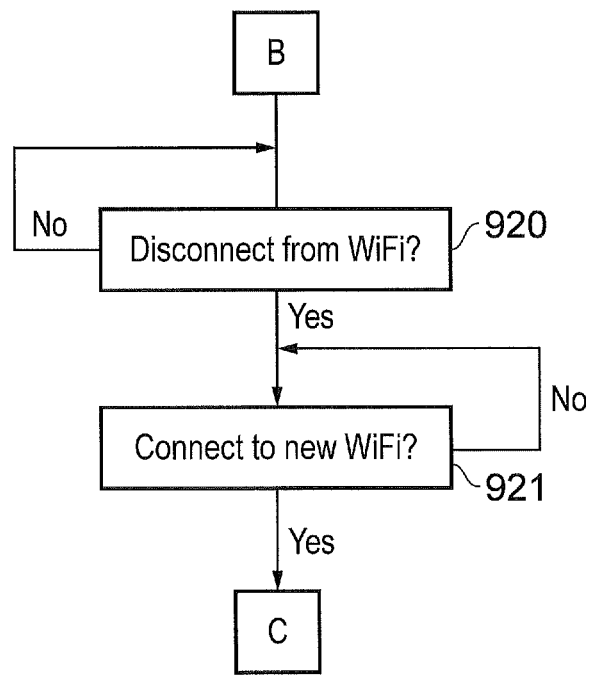
FIG. 9A (continued)

User Details in Regional Controller

| User ID | Current Location | Route | Priority |
|---|---|---|---|
| P3L3 | Virgin-236582 | 2 Jones Close to 32 Peter St | 1 |
| Steve.G | Virgin-436932 | 14 Red Square to 24 Lion Ave | 1 |
| Dave-B3ck5 | Virgin-352859 | 21 Goal St to 7 Free Close | 2 |
| Alan.S-No9 | Virgin-294605 | 1 Penalty Cres to 5 James St | 3 |

FIG. 10

METHOD, MOBILE TERMINAL AND COMPUTER PROGRAM

The present disclosure relates in general but not exclusively to a method, mobile terminal and computer program.

BACKGROUND

With the increasing use of portable terminals such as smart-phones, tablets and laptops, people require access to the internet when out of the house or work place. This has led to many "hotspots" being set up in cafes, restaurants, and on public transport.

Although users can connect to these hotspots when they are available, there are many areas still such as within train tunnels in a subway network that still do not have the requisite infrastructure. These areas where no infrastructure exists and thus no Internet connection exists is sometimes referred to as a "dead zone". The presence of dead zones means that the user does not have continual access to the Internet and may suddenly be disconnected from the Internet when entering the dead zone. This causes inconvenience to the user. Dead zones may exist in other transport environments or infrastructure.

It is an aim of embodiments of the present disclosure to address this problem.

SUMMARY OF THE DISCLOSURE

According to one aspect, there is provided a method of transmitting data from a mobile terminal over a wireless network, comprising the steps of: applying a different priority level to different types of data transmission; determining the quantity of data remaining before expiry of the data connection between the mobile terminal and the wireless network; and transmitting the different types of data over the network in an order determined by the applied priority level.

The determining step may comprise: determining the time before expiry of the data connection between the mobile terminal and the wireless network; determining the data throughput between the mobile terminal and the wireless network and determining the quantity of data remaining in accordance with the time and the data throughput.

The time determining step may comprise: receiving, over the wireless network, the value of time.

The time determining step may comprise: determining the speed and direction of travel of the mobile terminal with respect to the wireless network and determining the time in accordance with the speed and direction of travel of the mobile terminal.

The time determining step may comprise: determining whether the mobile terminal has previously connected to the wireless network in the locality; retrieving the time for which the mobile terminal had previously connected to the wireless network and setting the value of time as being the time for which the mobile terminal was previously connected.

The priority level may be determined in accordance with the content of the data transmission.

The priority level may be determined by the user.

The method may further comprise uploading to the wireless network, information regarding the route to be travelled by the mobile terminal.

The method may further comprise determining a list of tasks from within a plurality of application programs, each task being associated with a different type of data transmission, determining for at least two tasks the respective data quantity required to complete the task and starting tasks for which the quantity of data remaining before expiry of the data connection is sufficient.

The method may further comprise determining the connection quality between the mobile terminal and the wireless network before expiry of the data connection and determining the quantity of data remaining in accordance with the determined connection quality.

According to another aspect, there is provided a mobile terminal, comprising: communication circuitry configured to communicate with a wireless network and processing circuitry configured to apply a different priority level to different types of data transmission; determine the quantity of data remaining before expiry of the data connection between the mobile terminal and the wireless network; and to control the communication circuitry to transmit the different types of data over the network in an order determined by the applied priority level.

The processing circuitry may be further configured in the determining step to determine the time before expiry of the data connection between the mobile terminal and the wireless network; determine the data throughput between the mobile terminal and the wireless network and determine the quantity of data remaining in accordance with the time and the data throughput.

The processing circuitry may be configured in the time determining step to receive, over the wireless network, the value of time.

The processing circuitry may be configured in the time determining step to determine the speed and direction of travel of the mobile terminal with respect to the wireless network and to determine the time in accordance with the speed and direction of travel of the mobile terminal.

The processing circuitry may be configured in the time determining step to determine whether the mobile terminal has previously connected to the wireless network in the locality; retrieve the time for which the mobile terminal had previously connected to the wireless network and set the value of time as being the time for which the mobile terminal was previously connected.

The priority level may be determined in accordance with the content of the data transmission.

The priority level may be determined by the user.

The communication circuitry may be further configured, under control of the processing circuitry, to upload to the wireless network, information regarding the route to be travelled by the mobile terminal.

The processing circuitry may be further configured to determine a list of tasks from within a plurality of application programs, each task being associated with a different type of data transmission, determine for at least two tasks the respective data quantity required to complete the task and start tasks for which the quantity of data remaining before expiry of the data connection is sufficient.

The processing circuitry may be configured to determine the connection quality between the mobile terminal and the wireless network before expiry of the data connection and determine the quantity of data remaining in accordance with the determined connection quality.

Also provided is a computer program product comprising computer readable code that, when loaded onto a computer, configures the computer to perform a method according to any of the above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A-5E shows screenshots explaining the flowchart of FIG. 4;

FIG. 6 shows an example of the priority list located on the mobile terminal of FIG. 1;

FIG. 7 shows example of an application list on the terminal of FIG. 1;

FIG. 8 shows the user history located on the terminal of FIG. 1;

FIG. 10 shows an example of the user details stored within the regional controller in the system of FIG. 2.

DESCRIPTION OF THE EMBODIMENTS OF THE DISCLOSURE

Figure 1:
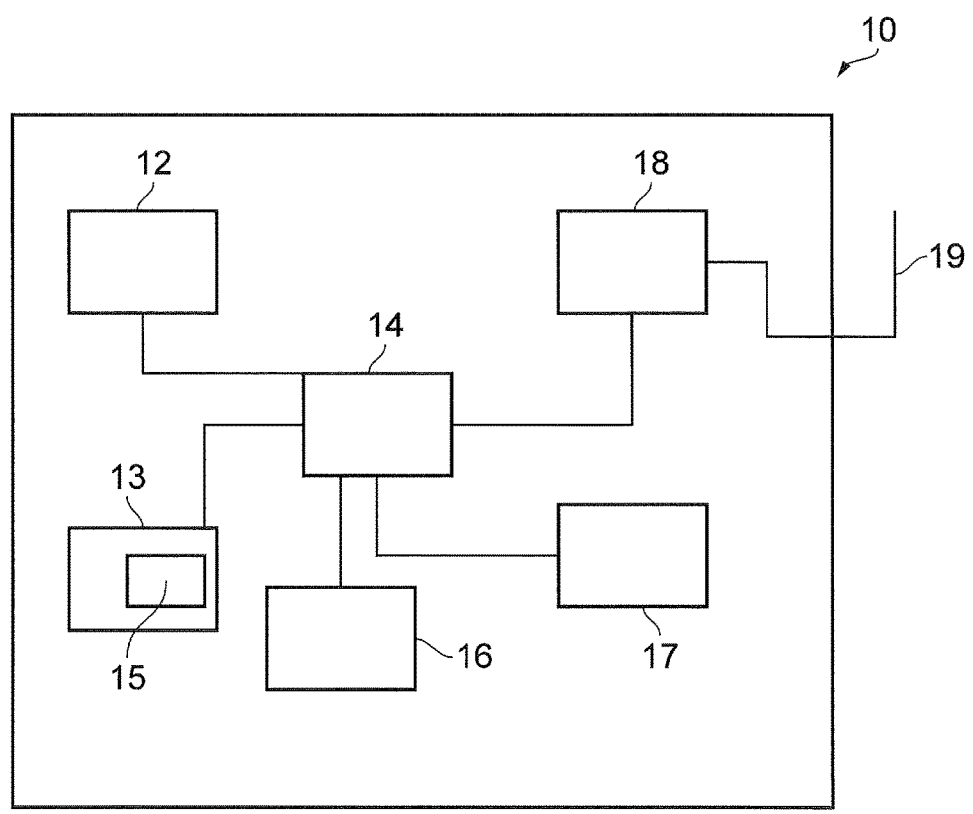
FIG. 1 shows a mobile terminal according to embodiments of the present disclosure.

Referring to FIG. 1, a mobile terminal 10 is shown. The mobile terminal may be any kind of device that is used remotely from a user's home or place of work. For example, the mobile terminal may be a laptop, a smartphone, a tablet, a PDA or the like.

The mobile terminal has a speaker unit 12 using which the operator of the mobile terminal 10 may listen to either voice or media content. The speaker unit 12 is connected to a processor unit 14. The processor unit 14 is circuitry that controls the operation of the mobile terminal 10 under the instruction of computer readable code. The computer readable code is stored in memory unit 16 which is also attached to the processor unit 14. The memory unit 16 may be any kind of storage device made of any material such as semi-conductor material or a magnetic readable disc or an optical reader disc or the like. Additionally connected to the processor unit 14 is a location unit 17. The location unit 17 identifies the geographical position of the mobile terminal 10 by means of a Global Positioning System (GPS) receiver, triangulation using either a cellular network or local WiFi hotspots or the like. Furthermore, a display 13 is also connected to the processor unit 14. The display may be any kind of display such as an Organic LED type display or an LCD type display. Located on the display is a touchscreen 15. As an example, this is a capacitive type touchscreen that allows the user to interact with content displayed on the display 13 and acts as a graphical user interface so that the user may interact with the content and provide instruction to the mobile terminal 10.

A communication unit 18 is connected to an antenna 19 or multiple antennae if needed for different protocols and the processor unit 14. The communication unit 18 may communicate with a base station such as a cellular base station supporting 3G, 4G/LTE and/or WiFi connectivity. This communication is made via the antenna 19.

Figure 2:
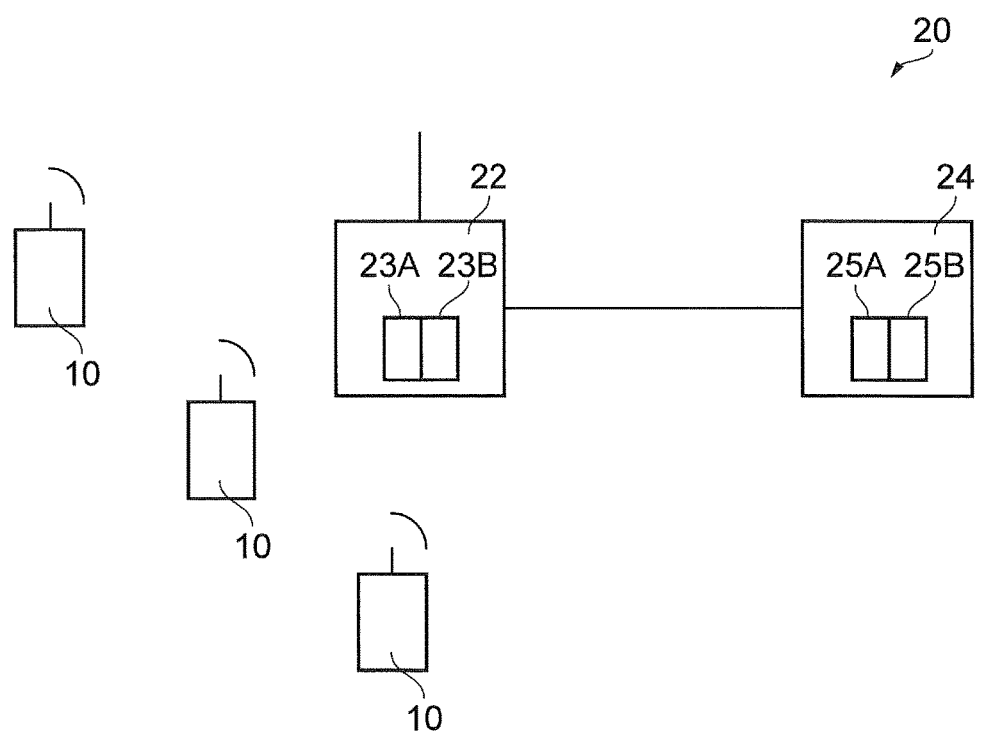
FIG. 2 shows a system of embodiments of the present disclosure.

Referring to FIG. 2, a system 20 is shown. The system 20 includes a base station 22 connected to a regional controller 24. The base station 22 also communicates with at least one mobile terminal 10 shown in FIG. 1. In the example of FIG. 2, three mobile terminals 10 are shown. However, as the skilled person would appreciate, any number of mobile terminals 10 may be provided. Similarly, and as will become apparent, the regional controller 24 may be connected to multiple base stations 22. However, for simplicity, only a single base station 22 is shown in the communication with the regional controller 24.

The base station 22 contains a base station control unit 23B and base station memory 23A. The base station control unit 23B is controlled using computer code stored within the base station memory 23A. Similarly, to the memory unit 16 in the mobile terminal of FIG. 1, the base station memory may be an optically readable medium or solid state medium or a magnetic readable medium.

The base station 22 is connected to the regional controller 24 using either a wired or wireless connection. In the specific embodiment of the disclosure, the wired connection is a fibre optic connection that allows large data transfer rate between the base station 22 and the regional controller 24. Of course, other types of communication line are envisaged such as a metallic wire such as a copper wire link or a wireless link such as a microwave link.

As already noted, the regional controller 24 will, typically, be connected to multiple base stations 22. The regional controller 24 comprises a regional controller control unit 25A and regional control memory 25B. As with the base station 22 the regional control unit 25A is a microprocessor that is controlled using computer code. This computer code is stored in the regional controller memory 25B the regional controller memory 25B may be any kind of memory such as solid state memory, optically readable memory or magnetic readable memory.

The function of the system 20 will be described later.

Figure 3:
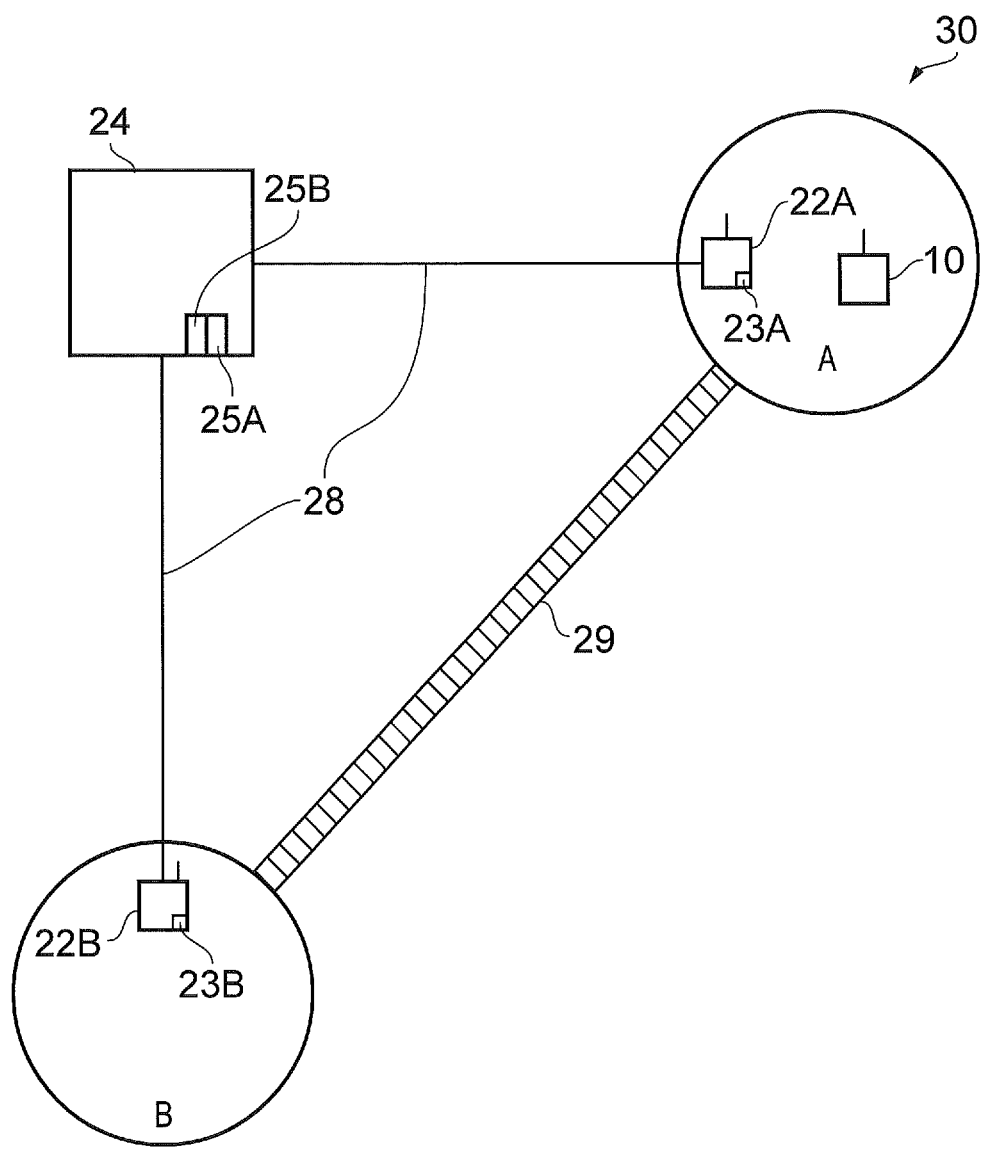
FIG. 3 shows the system of FIG. 2 in use.

With reference to FIG. 3, a regional system 30 is described. The regional system 30 includes a regional controller 24 connected to a first base station 22A and a second base station 22B. The first base station 22A, in embodiments of the disclosure, provides WiFi hotspot access to mobile terminal 10 when mobile terminal 10 is located in region A. In the scenario of FIG. 3, mobile terminal 10 is to travel to region B along a path 29. The path 29 is a dead zone in which the mobile terminal 10 will be disconnected from Internet or network access. In a typical example, region A may be a subway station and region B may be a different subway station. In this case, the dead zone 29 may be the tunnel connecting subway station A and subway station B.

Although, in embodiments, the dead zone refers to lack of WiFi coverage, the dead zone may refer to any kind of network, such as for example any form of radio network. For example, the dead zone may refer to lack of 3G, 4G or other kind of network coverage. In addition or alternatively, the dead zone may refer to a disconnection from a network due to other reasons. For example, the user of the mobile terminal 10 may have limited data remaining on their data tariff. Therefore the meaning of the dead zone is simply that the mobile terminal is disconnected from a data network. Formally, the term expiry of the data connection with the wireless network means both physically disconnecting from the wireless network by entering an area that does not have the appropriate infrastructure and ceasing data transmission due to a user specific requirement such as using all the data of a particular tariff.

A communication path 28 connects the first base station and the second base station with regional controller 24. Regional controller 24 controls the allocation of resource to both the first base station 22A and the second base station 22B. Although not shown, the regional controller 24 may be connected to other infrastructure such as a system that controls various regional controllers to ensure an integrated system. Furthermore, additionally or alternatively, the regional controller 24 may be connected to a "smart cities" network. "Smart cities" is a term of art which allows many aspects of the infrastructure of a city to communicate with one another in order to allocate appropriate resources to the city and the inhabitants of a city. For example in a smart cities environment, information relating to a traffic flow is fed to public transport in order to ensure smooth running of the public transport.

Figure 4:
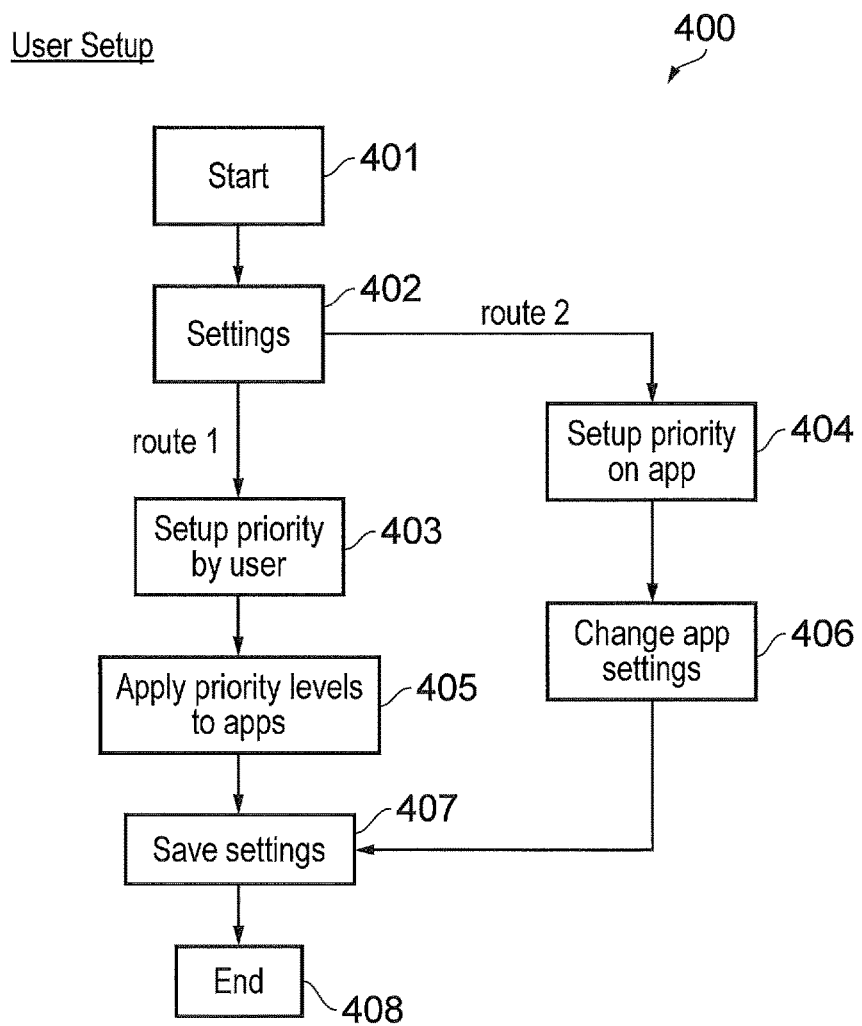
FIG. 4 shows a flowchart explaining the user setup in respect of the mobile terminal of FIG. 1.
Figure 5A:
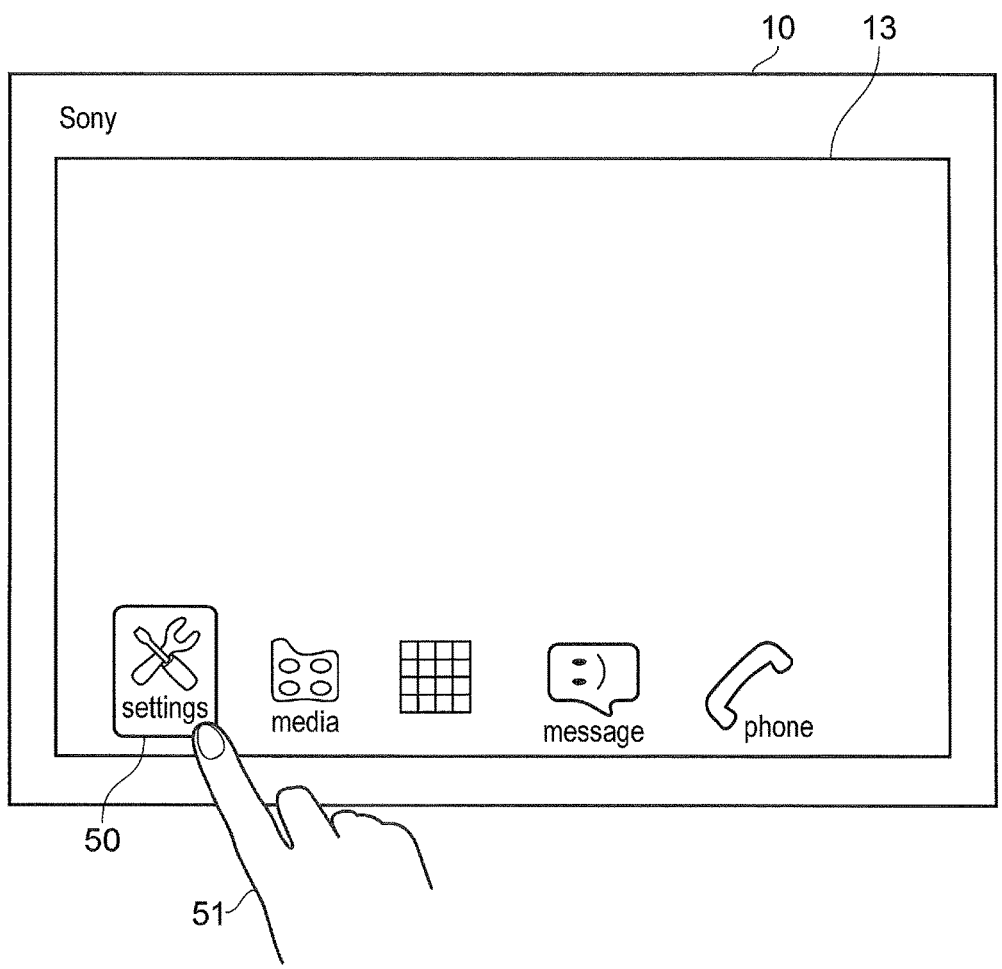

Referring to FIG. 4, a flowchart 400 explaining the user setup procedure on the mobile terminal 10 is described. The process starts in step 401. The user then presses "settings button" in step 402. This is shown pictorially in FIG. 5A by the user 51 pressing the settings icon 50 on the touchscreen of the display 13.

When the settings icon 50 is pressed, the settings screen 55 is displayed. The settings display allows the user to change certain settings within the mobile terminal 10. In the example shown in FIG. 5B, the user may press the "priority level for device" icon 57. If the user presses the "priority level for device" icon 57, the process of FIG. 4 will follow route 1 to step 403.

Figure 5C:
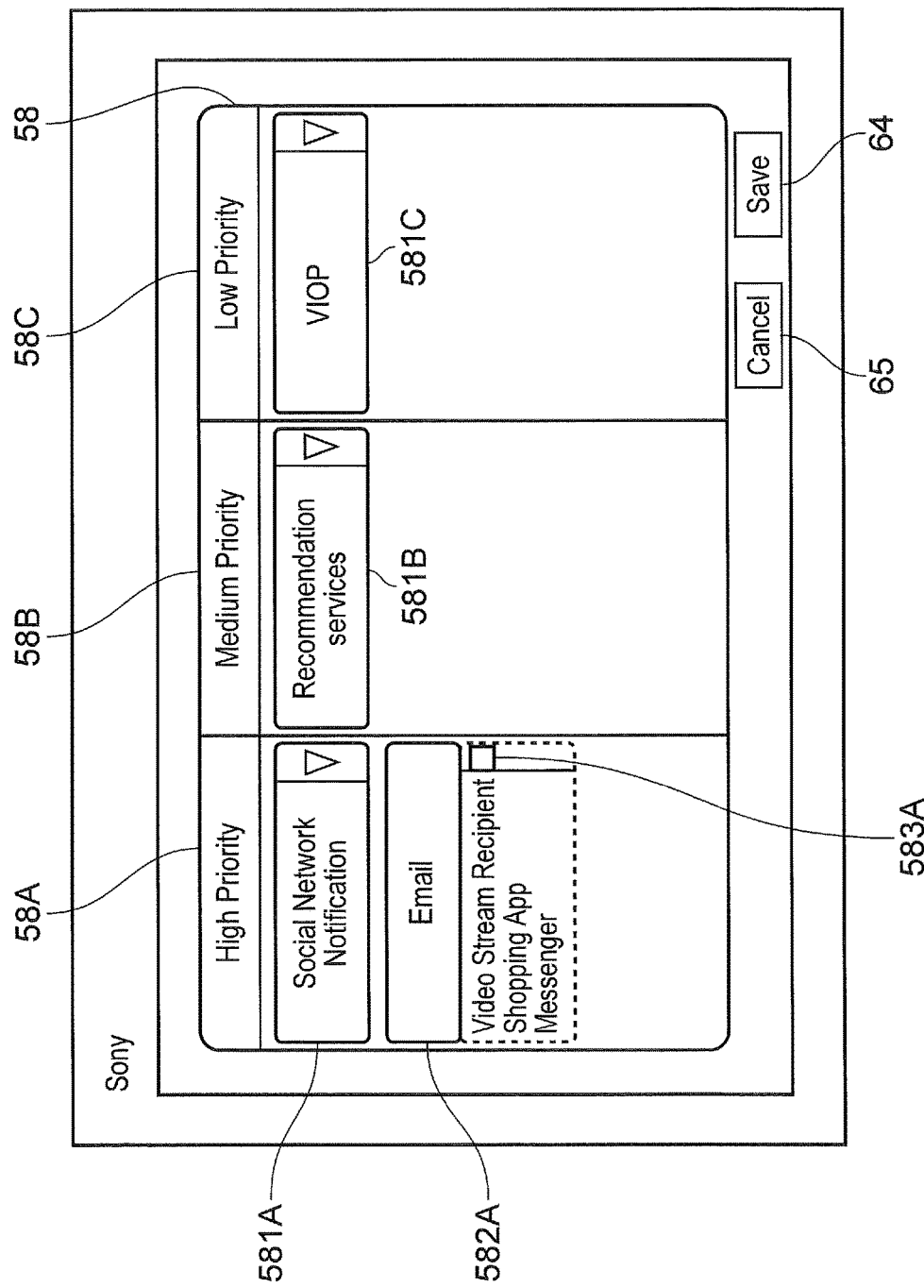

Referring to FIG. 5C, the user has the ability to set certain priority levels to type of data transmission. In other words, the user can select which types of data transmission (or which type of content is conveyed using the data) over the internet are important to the user of the mobile terminal 10. In the screen of FIG. 5C, the user is presented with a table having three columns; a high priority column 58A, a medium priority column 58B, and a low priority column 58C. Within each column, a dropdown icon is provided. This allows the user to allocate a certain type of data transmission to a certain level of priority. In the example of FIG. 5C, the user has applied a high priority to social network notifications such as notifications on Facebook, Twitter or the like. This is icon 581A. The user has selected recommendation services as being of medium priority. Recommendation services may consist of music recommendations or recommendations for a restaurant in the local vicinity to the mobile terminal 10 or the like. This is identified as icon 581B in FIG. 5C. The user has also applied a low priority to voice over IP services as shown in icon 581C.

For ease of understanding, the icon 582A is being set by the user in the example of FIG. 5C. Icon 582A currently reads "Email". However, as this icon is active, the entire array of data transmission types is provided to the user. Given that the number of different types of data is larger than may be displayed simultaneously on the screen, a scroll button 583A is provided on the dropdown icon 582A. The user thus scrolls down to all the different types of data transmissions such as video stream recipient, shopping apps, messenger or the like and may select the appropriate data transmission from the dropdown list. This allows the user to easily set the priority level for each different type of data transmission.

After the user has set the different types of priorities for the different types of data transmissions, the user may press the save button 64 or may cancel their selection by pressing button 65.

If the user saves their selection, the selected priority levels associated with each type of data transmission is then applied to each piece of software within the mobile terminal 10. Each piece of software is commonly referred to as an "app". The allocation of the priority levels to the different "apps" is step 405 of FIG. 4.

Figure 5D:
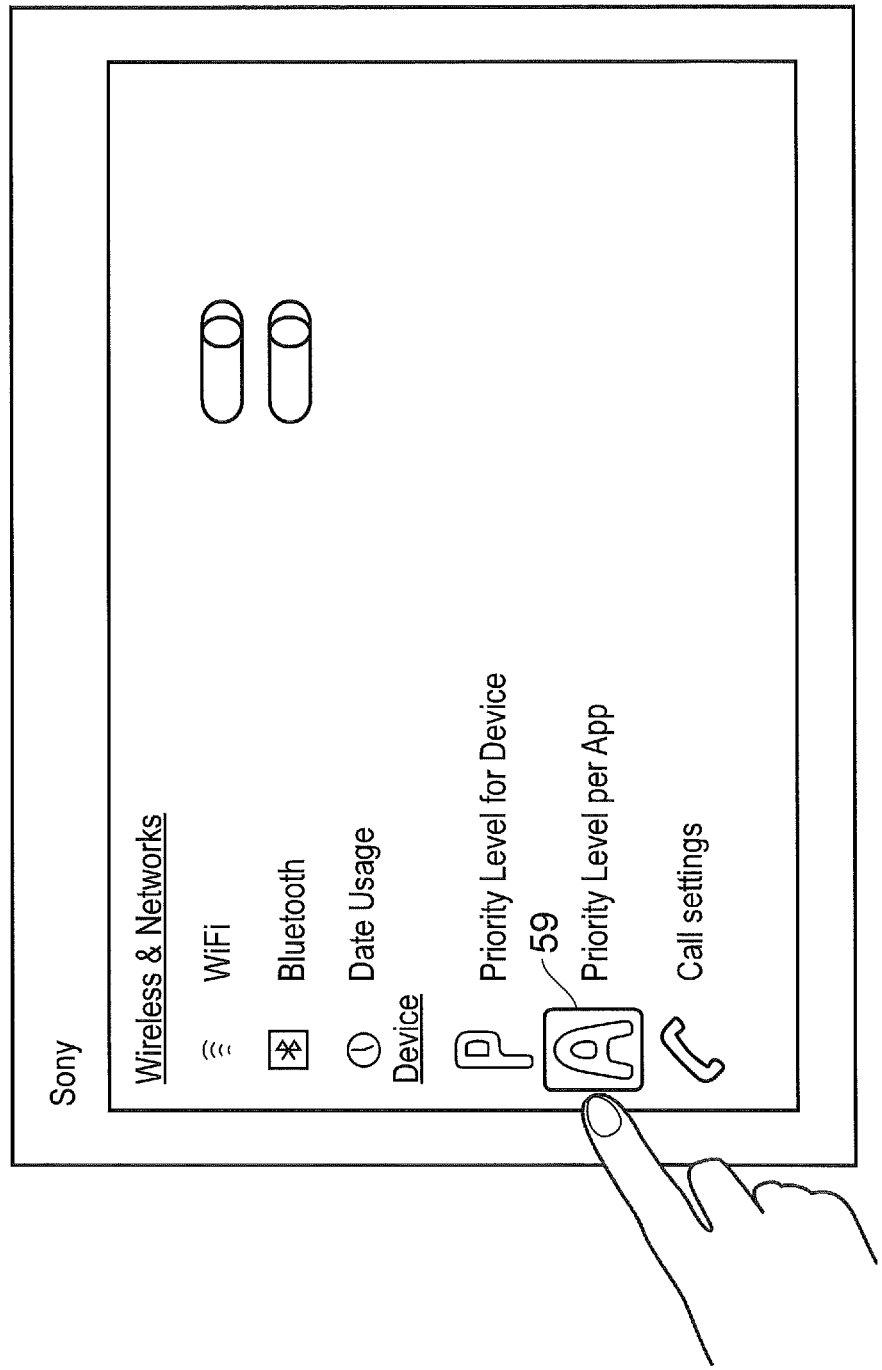

Returning now to step 402 of FIG. 4, if the user wishes to setup the priority of an app on an app by app basis, the user presses the priority level per app icon 59 as shown in FIG. 5D. The user then follows route 2 in FIG. 4. By pressing the priority level per app icon 59, the user starts step 404 of FIG. 4.

Figure 5E:
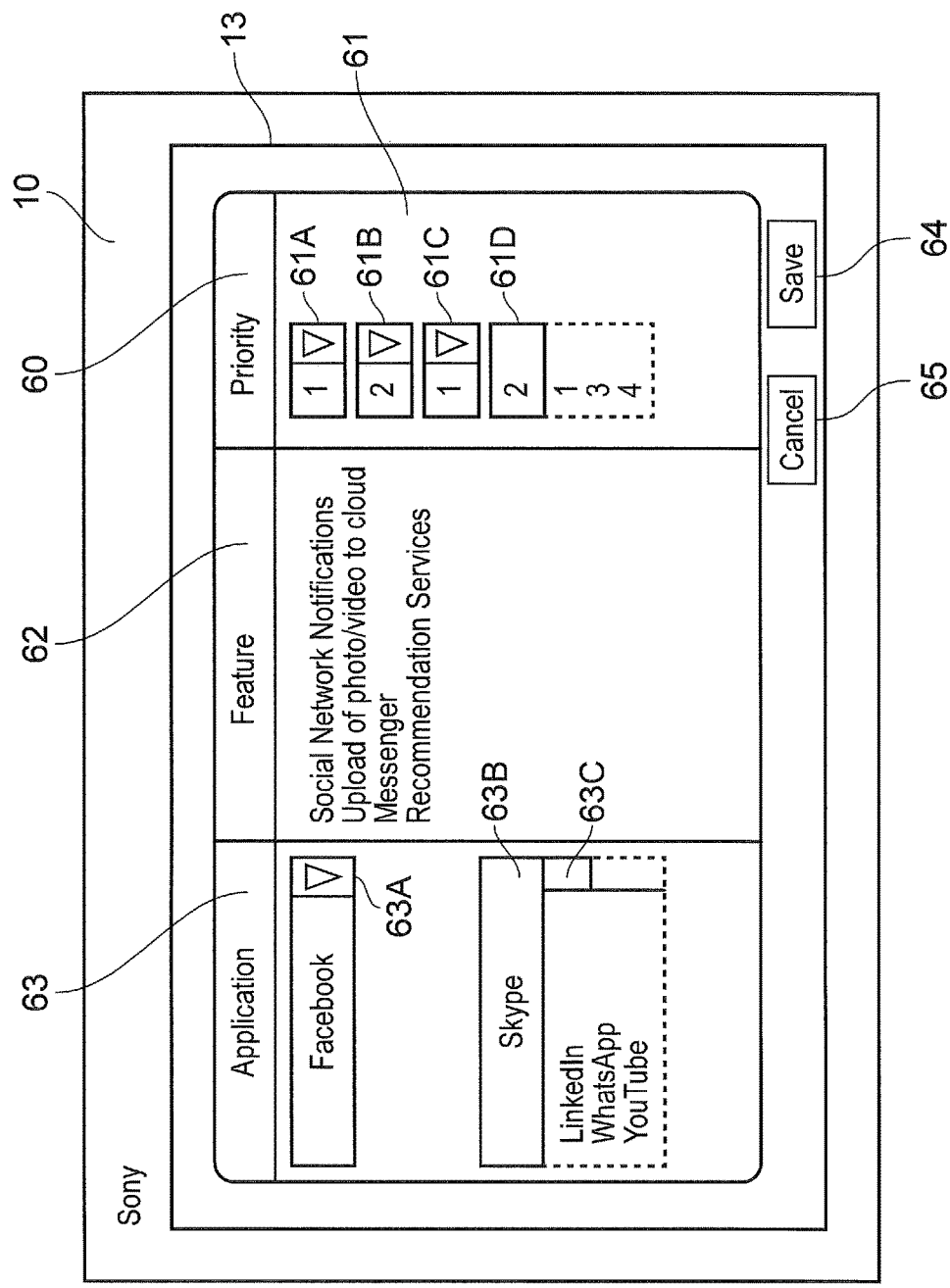

Referring to FIG. 5E, the application column 63 provides dropdown icons 63A and 63B. Within each dropdown icon 63A and 63B, a list of the apps stored within the mobile terminal 10 is displayed. In dropdown icon 63A, the user has selected "Facebook".

Associated with each app is a set of data transmission types. These are defined by the publisher of the app and appear in the feature column 62. In the case of Facebook app shown in dropdown icon 63A, social network notifications, upload a photo/video to cloud, messenger and recommendation services data transmission types are shown as being available within the app.

Associated with each of the different types of data transmission is a priority level. In the example shown in FIG. 5E, the social network notifications feature associated with Facebook 63A is given priority 1 in dropdown menu 61A. The upload of photo/video to cloud is given a priority of 2 in dropdown icon 61B. The messenger service is given a priority of 1 in icon 61C and the recommendation services are currently given a value of 2 in dropdown menu 61D. However, as shown in FIG. 5E, the user may select any of priorities 1 to 4.

The user, when clicking on the application icon 63B, is provided with a list of all the applications stored within the mobile terminal 10. If, as in this case, there are more applications than space available to display the apps in the dropdown menu, a slider 63C is provided so the user can simply scroll through the available apps.

Similarly to FIG. 5C, the user is also presented with a save button 64 and a cancel button 65.

If the user presses the save button 64, the app settings are changed within the mobile terminal 10 at step 406 of FIG. 4. The user can then exit the setup screen in step 407 of FIG. 4 where everything is saved and the process ends at step 408 of FIG. 4.

Referring to FIG. 6, a more detailed, although not exhaustive, list of type of data transmission and associated priorities are shown. Of course, these may be factory defaults which the user can customise on either an app by app basis or on a terminal level basis as explained with reference to FIG. 4 and FIGS. 5A-5E. Accordingly, the user of the mobile terminal 10 may change the priority associated with any of the data transmission types. The priority list is stored within the memory unit 16 of the mobile terminal 10.

Additionally, in FIG. 7, the list of apps stored on a terminal is shown. Of course, although two apps are shown, many more or different applications may be provided on the mobile terminal 10. In the example shown in FIG. 7, two apps ("Facebook" and "Skype") are shown.

Associated with each app is a list of data transmission types which are noted as "feature" with the table of FIG. 7. These data transmission types are set by the publishers of the app and are consistent between application providers. In other words, many different applications will have the same type of data being transferred and the same name to define that type of data will be applied to that app. This enables the user to select the appropriate priority level. This is exemplified in the FIG. 7 by the term "social network notifications" that are used by both Facebook and Skype applications. Again, the application list is stored within the memory unit 16 of the mobile terminal 10.

In operation, the mobile terminal 10 has a task orchestrator and a task broker. The task orchestrator and the task broker functionality is performed by the processing unit 14. So, the processing unit 14 is circuitry that performs the function of the task orchestrator and the task broker. The task orchestrator functionally identifies the applications that have data to be transmitted or received over the internet. The task orchestrator prioritises the data transmissions in accordance with the priority list stored within the memory unit 16. The task broker functionally then performs the data transmissions that have been prioritised by the task orchestrator.

The number of tasks that can be performed by the task broker is determined by the amount of data requiring transmission and the amount of time that the WiFi connection is predicted to have remaining.

Referring to FIG. 8, the user history is also stored within the memory unit 16 of the mobile terminal 10. The user history indicates the route taken by the user, and also the different "WIFI hotspots".

Referring to FIG. 8, a user history on the mobile terminal 10 is shown. This user history is stored within the memory unit 16 of the mobile terminal 10. The user history in general terms describes the occurrences of the mobile terminal 10 connecting to various base stations 22. In this particular example, the base station 22 is a WiFi hotspot and the location of the hotspots is defined by the SSID associated with the WiFi hotspot. Further, the time at which the mobile terminal 10 connected to the hotspot is shown. Of course, any type of base station is envisaged such as a 3G base station or an eNodeB (LTE base station) or the like.

In addition to the time at which the mobile terminal 10 connected to the WiFi hotspot, a further time entry may be shown indicating the time at which connection with the WiFi hotspot terminated. A further column is provided that details the average data throughput in megabits per second (Mb/s) of the WiFi hotspot.

A further column is provided entitled "Route". A route name is given. Additionally or alternatively, the start point and end point of the route is provided. The details of the location, connection time, disconnection time and data throughput is associated with the route. Therefore, by knowing a route, the user history provides details of the previous locations, times of connection and disconnection of the mobile terminal 10 and the average data throughput.

The route may be defined by the user prior to embarking on a journey. For example, if the user of the mobile terminal 10 travels from their home to work, this may be defined by the start address (21 Goal Street) and the end address (7 Free Close). The mobile terminal 10 then may connect to a WiFi hotspot locator (such as http://www.myhotspots.co.uk/) to populate the WiFi hotspots available along a particular route. Alternatively, the WiFi hotspots may appear as the user travels along the route for the first time. However, for regularly performed routes such as the journey to work, it is expected that the WiFi hotspots to which the user will connect at a particular time will be the same, or similar, every day. Furthermore, given that the WiFi traffic associated with a WiFi hotspot is similar at the same time of day, the average throughput at any particular WiFi hotspot will be similar at the same time of day.

Although the above mentions the user actively inputting the route, the mobile terminal 10 may pre-populate this information using a lifestyle tracking app such as "Life-Log" by Sony®. This type of app defines the geographical location of a user at a particular time. Therefore, the lifestyle tracking app will identify the location of the user at any time of the day and so may provide this information to the user history without any input by the user themselves.

Figure 9A:
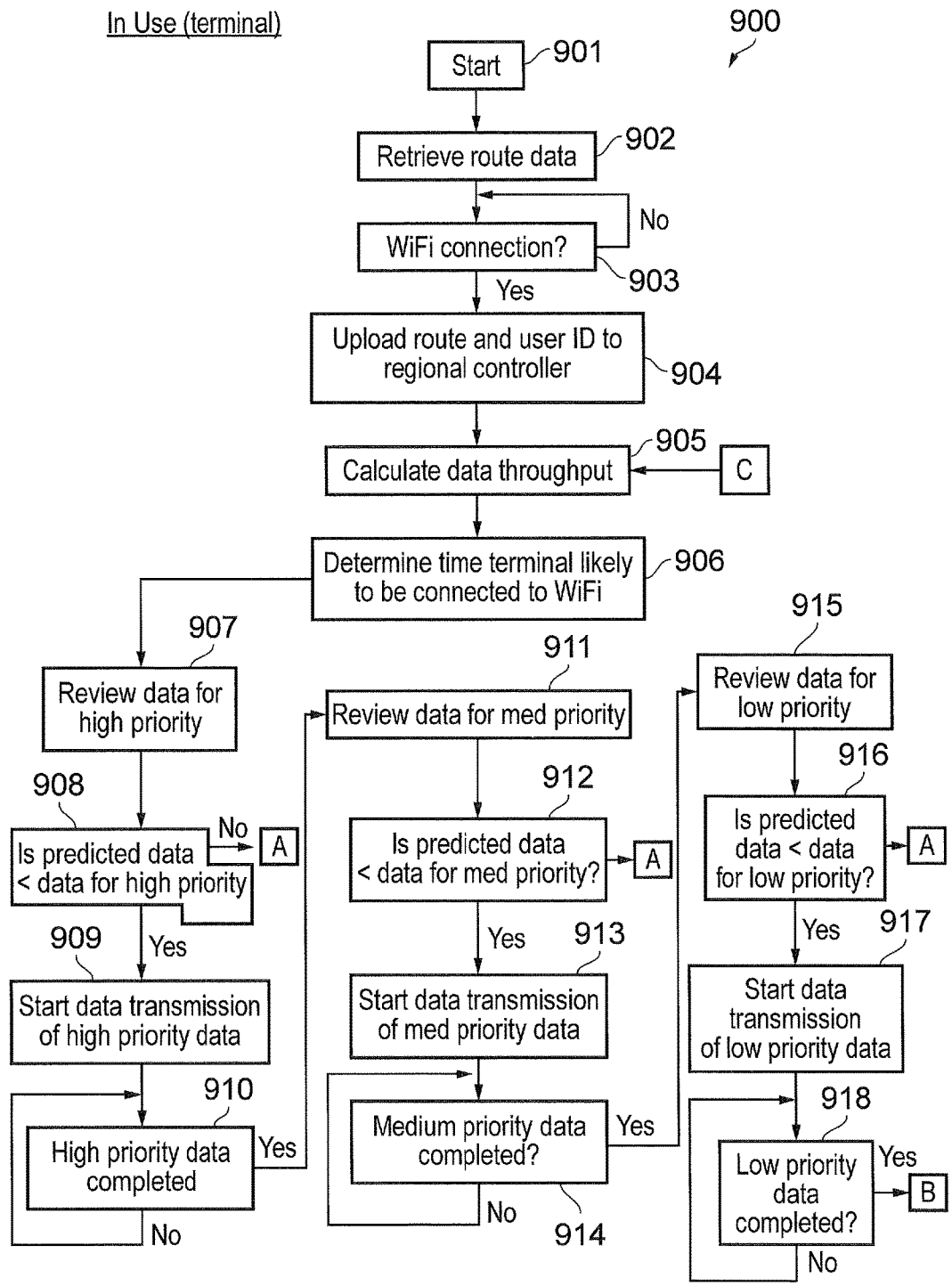
FIG. 9A shows a flowchart explaining the use of the terminal of FIG. 1.

Referring to FIG. 9A, a flowchart explaining the operation of the terminal 10 is shown. The flowchart 900 starts at step 901. The mobile terminal, under control of the processing unit 14 circuitry retrieves the route data from the user history in step 902. The route data may be based on the route that a user makes every week day at a certain time or may be programmed by the user and stored as a predefined route. The route data in this case, starts at 21 Goal Street and ends at 7 Free Close. Alternatively, the mobile terminal 10 may ask the user to manually input the route, or to select a route from the predefined list of routes stored within the mobile terminal 10.

The circuitry of the communication unit 18 then determines whether a WiFi connection is available. This is step 903. In the case that no WiFi connection is possible, the process returns and loops until a WiFi connection is made. In the case of a WiFi connection being made, the process moves to step 904 where the route and user ID is uploaded to a regional controller 24 using the WiFi connection. This is step 904. By uploading the route and the user ID to the regional controller 24, the system 20 knows the planned journey for each user and can allocate system resource appropriately. Although the aforementioned uploading of the user ID and the route to the regional controller 24 is made over WiFi, the disclosure is not so limited. This information may be provided separately to the WiFi connection over a 3G or LTE connection, or may be provided over a Near Field Communication (NFC) system. For example, when a user enters a subway system in London or Tokyo, it is possible to pay for travel using NFC technology. At the same time as paying using the mobile terminal 10, it will be possible to also upload the user ID and the route to the regional controller 24.

As the mobile terminal 10 connects to a particular WiFi hotspot, the data throughput associated with the WiFi hotspot is calculated in step 905. A more detailed explanation of the operation of the calculation of data throughput is described in FIG. 9B and will be explained later.

Having calculated the data throughput for the WiFi hotspot to which the mobile terminal 10 is currently connected, the time for which the mobile terminal 10 is likely to be connected to the WiFi hotspot is then determined in step 906. A detailed explanation of how this time is determined is explained in FIG. 9C.

The process then continues to step 907 of FIG. 9A. The processing unit 14 circuitry of the mobile terminal 10 in step 907 reviews the data within the mobile terminal 10 that is marked high priority. In other words, the mobile terminal 10 determines the amount of data that is stored in the high priority category within the mobile terminal 10. The process then moves to step 908 whereby the data that is to be transmitted with high priority is compared with the remaining predicted data capacity. In other words, the processing unit 14 of the mobile terminal 10 uses the calculated data throughput and the time that the terminal is likely to be connected to the WiFi to determine the amount of data that may be transmitted before the mobile terminal 10 ceases communication with the WiFi hotspot. This is achieved, in embodiments, by multiplying the calculated data throughput with the predicted time. Of course, although the foregoing mentions the predicted data capacity as being related to the amount of time that the mobile terminal 10 may communicate with the WiFi hotspot, the disclosure is not limited. For example, the remaining data capacity may relate to the amount of data that a user has remaining on a particular monthly contract, or as a pay-as-you go arrangement.

If the remaining data is less than the data for high priority, the "no" path is followed. On the other hand, if the predicted data is greater than the data required for transmission of the high priority data, the "yes" path is followed. If the "no" path is followed, then the process ends at step 919. Of course, in other embodiments, if the predicted data is less than the data required for transmission of the high priority data, it is possible that the mobile terminal 10 will transmit as much high priority data as possible before the mobile terminal 10 ceases communication with the base station 23. However, by only transmitting the high priority data when the mobile terminal 10 predicts that all the high priority data will be transmitted, it is possible that the mobile terminal 10 can better determine where along the route different priority levels of data may be transmitted. In other words, as the mobile terminal 10 knows in advance the locations along a route, the allocation of the data of the different priority levels may be planned in advance.

If the "yes" path is followed, the process continues to step 909 where the high priority data is transmitted to the WiFi hotspot. The step then moves onto 910 which checks if the high priority data has been completely transmitted. If the high priority data has not been transmitted, the process waits until the completion of the transmission of the high priority data.

After transmission of the high priority data, the "yes" path is followed and the system reviews the amount of data that needs to be transmitted as medium priority data. This is step 911.

A check is then made to see if the predicted data remaining is less than the amount of data of medium priority to be transmitted. This is step 912. Similarly to the high priority data, in this example, if the "no" path is followed, the process moves to step 919 and the process ends (although the disclosure is not so limited). However, if the amount of predicted data remaining is greater than the data categorised as medium priority data for transmission then the "yes" path is followed to step 913 where the transmission of medium priority data commences.

The process then moves to step 914 whereby a check is made to see if the transmission of medium priority data is completed. If not, then the process waits (i.e. follows the "no" path). However, once the medium priority data has been transmitted, the "yes" path is followed to step 915.

In step 915, the amount of data deemed to be low priority is reviewed and at step 916 it is determined whether the remaining predicted data is greater than the amount of data having a low priority to be transmitted. If the answer is "no", then the process ends at step 919. However, if the answer is "yes", the transmission of the low priority data is started in step 917. The system then checks in step 918 to determine if the low priority data transmission has completed. If the answer to this is "no", the process, in this example, waits until the low priority data is transmitted.

However, if the answer is "yes" then the process moves to step 920 to check whether the mobile terminal has disconnected from the WiFi. If the mobile terminal has not disconnected from WiFi then normal data usage commences such as viewing the internet or the like. Indeed, data of a high, medium and low priority may still commence. However, the transmission of only priority data is stopped. The process waits until the WiFi is disconnected. Once the mobile terminal 10 has disconnected from WiFi, there is a check to determine whether a new connection to a WiFi hotspot is made. If the answer is "no" then the process waits at step 921 until the connection to a new WiFi is made. After a connection to the new WiFi hotspot is made, the process returns to 905 where the data throughput for the new WiFi hotspot is calculated.

Figure 9B:
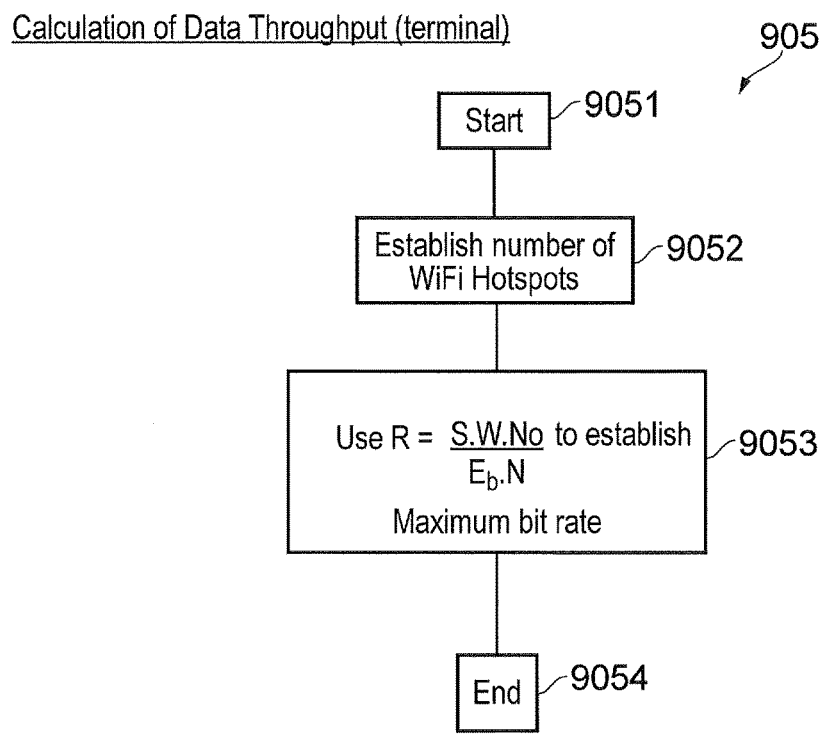
FIG. 9B shows the calculation of data through put step within FIG. 9A in more detail.

Referring to FIG. 9B, the calculation of data throughput at step 905 is explained in more detail. The process starts at step 9051. The processing unit 14 circuitry of the mobile terminal 10 then establishes the number of WiFi hotspots in the locality. This is step 9052 and is performed by detecting the SSIDs of other WiFi hotspots. This is performed so that a noise characteristic can be established. This then is used in the known equation (1) to establish the maximum bit rate in step S9053.

$$R = \frac{S \cdot W \cdot N_0}{E_b \cdot N} \tag{1}$$

Where $E_b$ is the energy per bit, $N_0$ is the noise power per bit, S is the signal strength, W is the bandwidth, N is the noise power spectral density and R is the maximum bit rate.

The process then ends at step 9054.

Figure 9C:
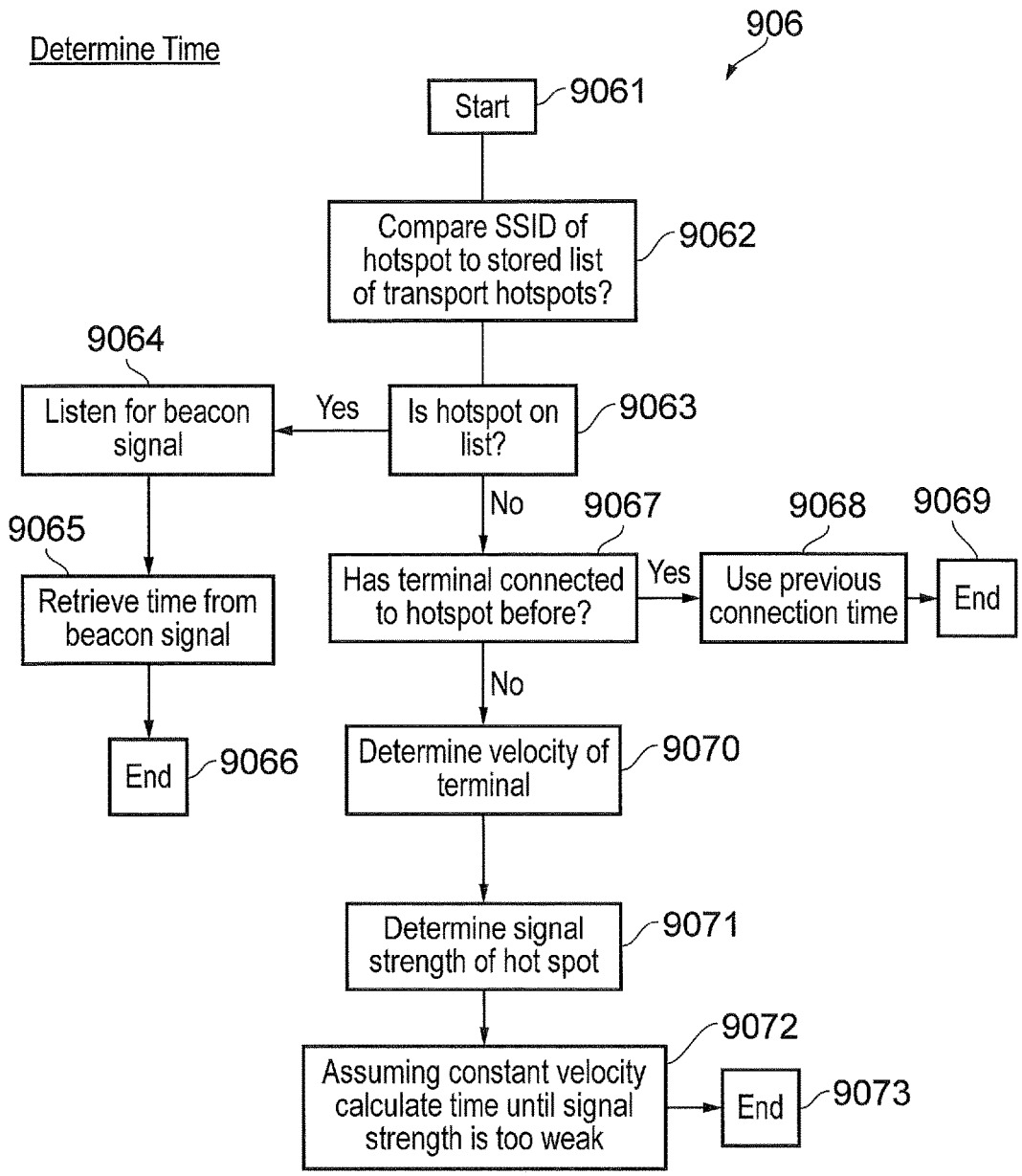
FIG. 9C shows the time determining step of FIG. 9A in more detail.

Referring now to FIG. 9C, the process for determining the time in step 906 of FIG. 9A is shown in greater detail. The process starts at step 9061. The SSID of the WiFi hotspot to which the mobile terminal 10 is connected is compared to a list of transport hotspots. This is done in step 9062. The list of transport hotspots is provided to the mobile terminal 10 via a website such as the "Transport for London" website or any other website. This list of hotspots provides the SSID of WiFi hotspots located on a platform of an underground station, for example. Alternatively and possibly in addition, the transport hotspots may be provided at bus stops and the like.

If the hotspot to which the mobile terminal 10 is currently connected is located on the list, the "yes" path from step 9063 is followed. The mobile terminal 10, and specifically the communication unit 18 in the mobile terminal 10 listens for the beacon signal transmitted by the hotspot in step 9064. Within the 802.11 protocol, there are customisable packets within the beacon signal of the management frame to which the communication unit 18 can listen. Within the beacon signal, the transport hotspot will include the amount of time until the next train or bus arrives at the platform or bus stop respectively. In other words, the beacon signal of the WiFi hotspot informs the mobile terminal 10 for how long the mobile terminal 10 will be in region A and thus the amount of time that the mobile terminal 10 will have before it enters the dead zone. The time is retrieved from the beacon signal in step 9065 and this is used to determine the time the terminal is likely to be connected to the WiFi. In other words, the base station informs the mobile terminal 10 of the time for which the mobile terminal 10 may communicate with the base station, and thus the amount of predicted data. The process then ends at step 9066.

If, on the other hand, the hotspot is not on the list of transport hotspots in step 9063, the "no" path is followed. The mobile terminal 10 interrogates the user history stored in memory unit 16 to determine if the terminal 10 has been connected to the hotspot before. This is done in step 9067. If the terminal has connected to the hotspot before, the "yes"

path is followed and the previous connection time noted in the user history is extracted from the memory unit 16 in step 9068. This time is used as the time the mobile terminal 10 is likely to be connected to the WiFi. The process then ends in step 9069.

If, on the other hand, the mobile terminal 10 has not connected to hotspot before, the "no" path is followed. The processor unit 14 of the mobile terminal 10 then determines the velocity of the mobile terminal 10 in step 9070. This may be achieved by determining how far the mobile terminal 10 has moved in a predefined period of time and also the direction in which the mobile terminal 10 has moved in this predetermined period of time. The process then moves to step 9071 where the signal strength of the hotspot is determined. From this information, and assuming that the velocity remains constant in the direction of travel, the time until the signal strength is too weak to connect to the WiFi hotspot is calculated in step 9072. This may be carried out using the following process in the circuitry of the processing unit 14. Firstly, a model is created that shows the relationship between the distance from a hotspot and the signal strength. This type of model will be created using experimental data and will be stored in the memory unit 16. Moreover, such models will include varying numbers of other WiFi hotspots so that interference may be taken into account. The mobile terminal 10 will use a known app such as "WiFi Analyzer" to determine the current signal strength. The speed of motion of the mobile terminal 10 will be measured by an accelerometer or the like located in the mobile terminal 10. A short period after the initial measurement of the signal strength, a second measurement of signal strength will be taken. In this context a short period may be 200 ms for example. This determines whether or not the movement of the mobile terminal 10 is towards or away from the WiFi hotspot.

The speed of the mobile terminal 10 is again determined by the accelerometer. As the mobile terminal 10 knows the signal strength of the WiFi hotspot and the speed of the mobile terminal 10 from measurement as well as the distance from the WiFi hotspot when the signal will be too weak to operate, the mobile terminal 10 will determine the time remaining until the WiFi hotspot connection is lost. This time is then used as the determined time. The process then ends in step 9073.

Referring to FIG. 10, the regional controller 24 stores the details of the current users connected to base stations which are under the control of the regional controller 24. The current users are each allocated a User ID. This User ID is unique to the user and may be the ID using which the user connects to the WiFi network. Additionally provided is the Current Location of the mobile terminal 10. The Current Location may be a geographical position or may be, as in this case, the identity of the WiFi hotspot to which the mobile terminal 10 is connected. The Route of each user is also stored. This Route may include the identity of the WiFi hotspots to which the mobile terminal 10 will connect on the journey. Alternatively, the Route may be the address of the start point and the end point of the journey. In either case, the Route is provided by the mobile terminal 10 in step 904 of FIG. 9A. Finally, the Priority of each User is stored. The Priority of each User is the priority level of access the user has to the WiFi network. In the example of FIG. 10, three priority levels are set. The highest level of priority is level 1 and the lowest level of priority is level 3. For a User having a level 1 priority, they are given the highest priority for connection to a WiFi hotspot in periods of heavy usage. For a User having a level 3 priority, they are given the lowest level of priority for connection to a WiFi hotspot in periods of heavy usage. In other words, if the WiFi hotspot is heavily loaded, the regional controller 24 will instruct the WiFi hotspot to maintain connection with high priority level customers but release the connection to lower priority customers. The selection of the priority level associated with a customer may be made on a number of factors. For example, the selection may be made on the basis of the data tariff so a user paying more money for connection to the WiFi will be given a higher priority.

Figure 11:
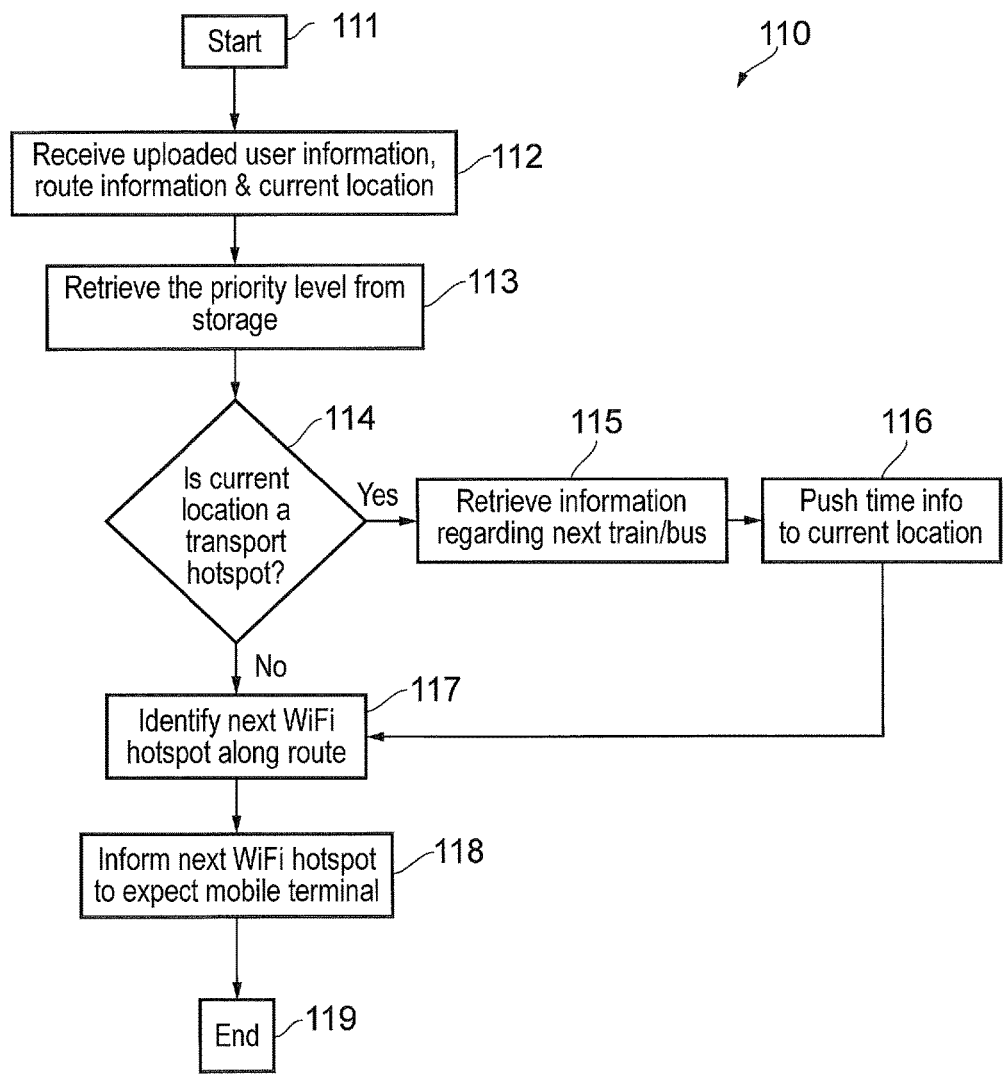
FIG. 11 shows a flowchart explaining the operation of the regional controller.

Referring to FIG. 11, the operation of the regional controller 24 is shown in flow chart 110. The process begins at step 111. The regional controller 24 receives the user information and route information uploaded by the mobile terminal 10 in step 904 of FIG. 9A. Additionally provided to the regional controller 24 is the current location of the mobile terminal 10. This is step 112. The process moves to step 113 where the priority level associated with the user is retrieved. The priority level of each user may be stored within a central database not shown to which every regional controller 24 is connected.

A check is made at step 114 that determines whether the current location is a transport hotspot. If the current location is a transport hotspot, the "yes" path is followed and the process moves to step 115. In step 115, information relating to the amount of time to the next train or bus is retrieved from the transportation authorities. The time information retrieved in step 115 is pushed to the current location in step 116. The time information is used in the WiFi hotspot of the current location to generate the Beacon Signal used in FIG. 9C. The process then moves to step 117.

Returning now to step 114, if the current location is not a transport hotspot, the "no" path is followed and the process also moves to step 117.

In step 117 the next WiFi hotspot is identified by the regional controller along the route provided by the mobile terminal 10. This is possible because the mobile terminal 10 has defined the route and provided this to the regional controller in step 112.

The regional controller 24 informs the next WiFi hotspot along the route that the mobile terminal 10 will be transferring to its control. The regional controller 24 may also provide the priority level associated with the user so that the base station can allocate appropriate resource when connected.

Although not necessary, it is possible that the regional controller 24 will inform the new WiFi hotspot of an approximate arrival time of the mobile terminal 10. This may be achieved for a transport hotspot by interrogating the transportation authorities' database as the time to the next train or bus can be retrieved and the time taken for the journey between zone A and zone B is known. Therefore, the amount of time before the mobile terminal 10 arrives at the next location is approximately the sum of the time until the next train or bus and the journey time. Alternatively, if the hotspot is not a transport hotspot, the amount of time until the mobile terminal 10 reaches the next WiFi hotspot may be the time determined in step 906 of FIG. 9A which may be provided to the regional controller 24 after calculation by the mobile terminal 10. If provision of the approximate arrival time is given, it is possible for the next WiFi hotspot to better manage its resources.

The process proceeds to end at step 119.

The aforesaid process in FIG. 11 is conducted by a processor located in the regional controller 24. The processor is circuitry that carries out computer instructions stored in the regional controller memory 25 as a computer program.

Although the aforesaid is described with reference to a user in a public hotspot scenario, the disclosure is not so limited. The connection may be to a private network such as a business network where priority may be provided to users (employees) receiving phone calls from a limited set of telephone numbers of VOIP. This enables the employees to receive only important personal calls over the company infrastructure.

Although the aforesaid is described with reference to a transport infrastructure including buses and trains, the disclosure is not so limited. The base station 22 may be located in a user's automobile and the route information may be provided by the satellite navigation system. In this case, the regional controller 24 will control the base station 22 within a number of vehicles. The communication between the regional controller 24 and the base station 22 in this instance will be over 3G or LTE as examples.

Of course, the automobile may also be couple to the mobile terminal 10. For example, the user may dock the mobile terminal 10 in the automobile for charging using wireless technology. During the docking process, the mobile terminal 10 may also communicate data with the automobile. This allows the automobile to function as the mobile terminal 10 so that the automobile may prioritise the different types of data transmission. For example, in this case, high priority information may be updates to integrated satellite navigation systems or engine management updates, medium priority information may be instant traffic updates and low priority information may be location based updates, such as local fuel prices or the like.

Although the foregoing discusses prioritising certain data types, during the transmission of the different data types, it is envisaged that no other transmission of data is carried out. For example, general app updates are stopped until all the data categorised as high, medium or low priority has been transmitted. Of course, the other data transmission may be carried out when only low and/or medium priority data remains to be transmitted.

The foregoing describes each individual data transmission type as having one priority. However, the disclosure is not so limited and each data transmission type may have a number of different priorities depending on the content of the data. For example, in the above example, Email transmissions are described as being of high priority. Typically, many people receive different types of Email messages. Broadly speaking, these may be categorised as personal Email, business Email and spam. In this context, spam Emails include Emails that are both informative to the user (such as promotions, social network updates and the like) and non-informative (such as phishing Emails and unwanted advertisements and the like). Presently, there are many spam filters that identify spam Emails to the user. It is envisaged that for example, within the prioritisation of Emails, personal and business Emails may be of high priority, informative spam may be medium priority and non-informative spam is of low priority. It is envisaged that the content of either the body of the Email or the subject line, or even the sender may also determine the priority level associated with the prioritisation of the Email. For example, where an Email has a particular sender or keyword located in the subject or the body of the Email, this may be classified as a high priority Email, whereas a different sender or different keyword would mean that the priority level is either low priority or medium priority.

Further, it is envisaged that the body of the Email and any attachment may be classified with different priorities. For example, a user may wish to receive an Email message as high priority but any attachments with low or medium priority. This ensures that where the remaining data is low, the user can receive all their Emails as a priority and then any attachments later.

One type of known email server is an IMAP email server. The present disclosure may provide for improvements to IMAP servers or may operate in conjunction with IMAP servers. According to some embodiments the disclosure provides:

A method of downloading electronic mail from a server, each mail item comprising a header and a body, the header including sender and subject information, the method comprising the steps of: configuring, in memory at the server, end user configurable prioritisation information; requesting receipt of email items; and upon connection, receiving firstly header information and subsequently receiving body information in a priority order from the server according to the prioritisation information.

In some embodiments the prioritisation information is configured according to one or more of
  sender information arranged in a priority list (the priority may be arranged by an end user)
  data size of body information (and optionally data size of data held on other servers to which the email hyperlinks, these files would need to be analysed on the fly by the server)

In some embodiments the prioritisation can be recalculated at the server in accordance with data received from an end user device representing the data quantity remaining before expiration of connection. This increases the likelihood of the user receiving useful emails before expiration of the connection making efficient use of bandwidth. The priority order may be interrupted by an instantaneous request by end user selection for the body information of an email item by selecting header information of email which has been received. In this way, if a user identified header information that is of particular interest, the server may allow access to respective body information straight way, interrupting any other downloads. A server and end user terminal configured to operate and having suitably configured circuitry according to the above is within scope of this disclosure.

The foregoing describes the beacon signal from the WiFi hotspot (base station 24) as including time information relating to the next train arrival from the Transportation Authorities. However, the base station 24 may collect feedback from other mobile terminals 10 in the locality. This information may include data throughput information about other base stations 24 to be encountered by the mobile terminal 10 from other mobile terminals 10 travelling in the opposite direction.

Embodiments of the present disclosure may in general be defined according the following numbered paragraphs:

1. A method of transmitting data from a mobile terminal over a wireless network, comprising the steps of: applying a different priority level to different types of data transmission; determining the quantity of data remaining before expiry of the data connection between the mobile terminal and the wireless network; and transmitting the different types of data over the network in an order determined by the applied priority level.

2. A method according to paragraph 1, wherein the determining step comprises: determining the time before expiry of the data connection between the mobile terminal and the wireless network; determining the data throughput between the mobile terminal and the wireless network and determining the quantity of data remaining in accordance with the time and the data throughput.

3. A method according to paragraph 2, wherein the time determining step comprises: receiving, over the wireless network, the value of time.

4. A method according to paragraph 2, wherein the time determining step comprises: determining the speed and direction of travel of the mobile terminal with respect to the wireless network and determining the time in accordance with the speed and direction of travel of the mobile terminal.

5. A method according to paragraph 2, wherein the time determining step comprises: determining whether the mobile terminal has previously connected to the wireless network in the locality; retrieving the time for which the mobile terminal had previously connected to the wireless network and setting the value of time as being the time for which the mobile terminal was previously connected.

6. A method according to any preceding paragraph wherein the priority level is determined in accordance with the content of the data transmission.

7. A method according to any one of paragraphs 1 to 5 wherein the priority level is determined by the user.

8. A method according to any preceding paragraph further comprising uploading to the wireless network, information regarding the route to be travelled by the mobile terminal.

9. A method according to any preceding paragraph, further comprising determining a list of tasks from within a plurality of application programs, each task being associated with a different type of data transmission, determining for at least two tasks the respective data quantity required to complete the task and starting tasks for which the quantity of data remaining before expiry of the data connection is sufficient.

10. A method according to any preceding paragraph comprising determining the connection quality between the mobile terminal and the wireless network before expiry of the data connection and determining the quantity of data remaining in accordance with the determined connection quality.

11. A mobile terminal, comprising: communication circuitry configured to communicate with a wireless network and processing circuitry configured to apply a different priority level to different types of data transmission; determine the quantity of data remaining before expiry of the data connection between the mobile terminal and the wireless network; and to control the communication circuitry to transmit the different types of data over the network in an order determined by the applied priority level.

12. A terminal according to paragraph 11, wherein the processing circuitry is further configured in the determining step to determine the time before expiry of the data connection between the mobile terminal and the wireless network; determine the data throughput between the mobile terminal and the wireless network and determine the quantity of data remaining in accordance with the time and the data throughput.

13. A terminal according to paragraph 12, wherein the processing circuitry is configured in the time determining step to receive, over the wireless network, the value of time.

14. A terminal according to paragraph 12, wherein the processing circuitry is configured in the time determining step to determine the speed and direction of travel of the mobile terminal with respect to the wireless network and to determine the time in accordance with the speed and direction of travel of the mobile terminal.

15. A terminal according to paragraph 12, wherein processing circuitry is configured in the time determining step to determine whether the mobile terminal has previously connected to the wireless network in the locality; retrieve the time for which the mobile terminal had previously connected to the wireless network and set the value of time as being the time for which the mobile terminal was previously connected.

16. A terminal according to any one of paragraphs 11 to 15 wherein the priority level is determined in accordance with the content of the data transmission.

17. A terminal according to any one of paragraphs 1 to 5 wherein the priority level is determined by the user.

18. A terminal according to any one of paragraphs 11 to 17 wherein the communication circuitry is further configured, under control of the processing circuitry, to upload to the wireless network, information regarding the route to be travelled by the mobile terminal.

19. A terminal according to any one of paragraphs 11 to 18, wherein the processing circuitry is further configured to determine a list of tasks from within a plurality of application programs, each task being associated with a different type of data transmission, determine for at least two tasks the respective data quantity required to complete the task and start tasks for which the quantity of data remaining before expiry of the data connection is sufficient.

20. A terminal according to any one of paragraphs 11 to 19 wherein the processing circuitry is configured to determine the connection quality between the mobile terminal and the wireless network before expiry of the data connection and determine the quantity of data remaining in accordance with the determined connection quality.

21. A computer program product comprising computer readable code that, when loaded onto a computer, configures the computer to perform a method according to any one of paragraphs 1 to 10.

22. A computer readable storage medium configured to store the computer program product of paragraph 21 therein or thereon.

23. A method, mobile terminal or computer program product as substantially hereinbefore described with reference to the accompanying Figures.

The invention claimed is:

1. A method of transmitting data from a mobile terminal over a wireless network, comprising:
    applying a different priority level to different types of data transmission;
    determining a quantity of data remaining before expiry of a data connection between the mobile terminal and the wireless network; and
    transmitting the different types of data over the network in an order determined by the applied priority level in connection with the quantity of data remaining before the expiry of the data connection including:
        transmitting all data of a particular data transmission of a particular priority level when a quantity of all of the data of the particular data transmission of the particular priority is less than the quantity of data remaining before the expiry of the data connection, and
        transmitting no data of the particular data transmission of the particular priority level when the quantity of all of the data of the particular data transmission of the particular priority is greater than the quantity of data remaining before the expiry of the data connection.

2. The method according to claim 1, wherein the determining comprises:

determining a time before the expiry of the data connection between the mobile terminal and the wireless network;

determining a data throughput between the mobile terminal and the wireless network; and determining the quantity of data remaining before the expiry of the data connection in accordance with the time before the expiry of the data connection and the data throughput.

3. The method according to claim 2, wherein the determining the time before the expiry of the data connection comprises:

receiving, over the wireless network, a value of the time before the expiry of the data connection.

4. The method according to claim 2, wherein the determining the time before the expiry of the data connection comprises:

determining a speed and a direction of travel of the mobile terminal with respect to the wireless network; and determining the time before the expiry of the data connection in accordance with the speed and the direction of travel of the mobile terminal.

5. The method according to claim 2, wherein the determining the time before the expiry of the data connection comprises:

determining whether the mobile terminal has previously been connected to the wireless network;

retrieving a time for which the mobile terminal had previously been connected to the wireless network; and setting a value of the time before the expiry of the data connection as being the time for which the mobile terminal had previously been connected.

6. The method according to claim 1 wherein the priority level is determined in accordance with a content of the data transmission.

7. The method according to claim 1 wherein the priority level is determined by a user.

8. The method according to claim 1, further comprising:

determining a list of tasks from within a plurality of application programs, each task being associated with a different type of data transmission;

determining for at least two tasks a respective data quantity required to complete the task; and starting the tasks for which the quantity of data remaining before expiry of the data connection is determined to be sufficient based upon the data quantities required to complete the tasks.

9. The method according to claim 1, further comprising:

determining a connection quality between the mobile terminal and the wireless network before the expiry of the data connection; and determining the quantity of data remaining before the expiry of the data connection in accordance with the determined connection quality.

10. A mobile terminal, comprising:

communication circuitry configured to communicate with a wireless network, and processing circuitry configured to:

apply a different priority level to different types of data transmission;

determine a quantity of data remaining before expiry of a data connection between the mobile terminal and the wireless network; and control the communication circuitry to transmit the different types of data over the network in an order determined by the applied priority level in connection with the quantity of data remaining before the expiry of the data connection including:

transmitting all data of a particular data transmission of a particular priority level when a quantity of all of the data of the particular data transmission of the particular priority is less than the quantity of data remaining before the expiry of the data connection, and transmitting no data of the particular data transmission of the particular priority level when the quantity of all of the data of the particular data transmission of the particular priority is greater than the quantity of data remaining before the expiry of the data connection.

11. The terminal according to claim 10, wherein the processing circuitry is further configured to:

determine a time before the expiry of the data connection between the mobile terminal and the wireless network;

determine a data throughput between the mobile terminal and the wireless network; and determine the quantity of data remaining before the expiry of the data connection in accordance with the time before the expiry of the data connection and the data throughput.

12. The terminal according to claim 11, wherein the processing circuitry is further configured to receive, over the wireless network, a value of the time before the expiry of the data connection.

13. The terminal according to claim 11, wherein the processing circuitry is further configured to:

determine a speed and a direction of travel of the mobile terminal with respect to the wireless network; and determine the time before the expiry of the data connection in accordance with the speed and the direction of travel of the mobile terminal.

14. The terminal according to claim 11, wherein processing circuitry is further configured to:

determine whether the mobile terminal has previously been connected to the wireless network;

retrieve a time for which the mobile terminal had previously been connected to the wireless network; and set a value of the time before the expiry of the data connection as being the time for which the mobile terminal had previously been connected.

15. The terminal according to claim 10 wherein the priority level is determined in accordance with a content of the data transmission.

16. The terminal according to claim 10 wherein the priority level is determined by a user.

17. The terminal according to claim 10 wherein the processing circuitry is further configured to control the communication circuitry to upload, to the wireless network, information regarding a route to be traveled by the mobile terminal.

18. The terminal according to claim 10, wherein the processing circuitry is further configured to:

determine a list of tasks from within a plurality of application programs, each task being associated with a different type of data transmission;

determine for at least two tasks a respective data quantity required to complete the task; and start the tasks for which the quantity of data remaining before expiry of the data connection is determined to be sufficient based upon the data quantities required to complete the tasks.

19. The terminal according to claim 10 wherein the processing circuitry is further configured to:

determine a connection quality between the mobile terminal and the wireless network before the expiry of the data connection; and determine the quantity of data remaining before the expiry of the data connection in accordance with the determined connection quality.

20. A non-transitory computer readable medium including computer program instructions that, when executed by a computer, cause the computer to perform a method according to claim 1.

* * * * *